No. 636,570. Patented Nov. 7, 1899.
J F. SHUGERS.
ATTACHMENT FOR BICYCLES.
(Application filed Aug. 12, 1899.)
(No Model.)
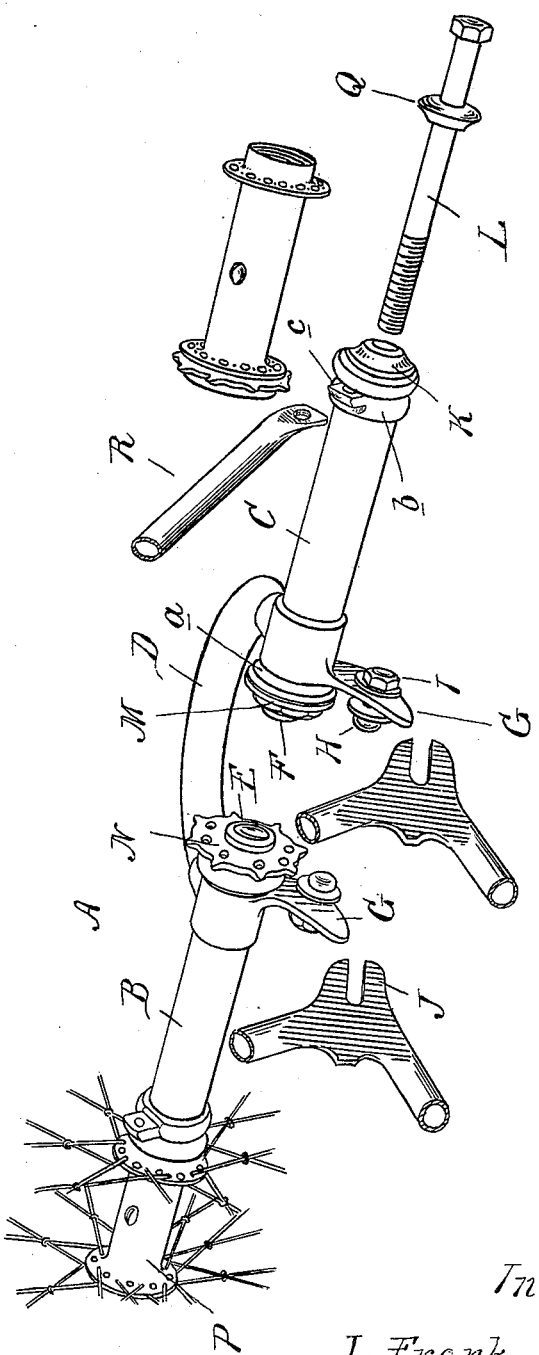
Witnesses:
H. C. Smith.
M. B. Dogherty.
Inventor:
J. Frank Shugers
By Sprague & Dougherty Attys.

UNITED STATES PATENT OFFICE.

J FRANK SHUGERS, OF COLDWATER, MICHIGAN.

ATTACHMENT FOR BICYCLES.

SPECIFICATION forming part of Letters Patent No. 636,570, dated November 7, 1899.

Application filed August 12, 1899. Serial No. 726,984. (No model.)

*To all whom it may concern:*

Be it known that I, J FRANK SHUGERS, a citizen of the United States, residing at Coldwater, in the county of Branch and State of Michigan, have invented certain new and useful Improvements in Attachments for Bicycles, of which the following is a specification, reference being had therein to the accompanying drawing.

The invention has reference to an attachment particularly designed for use in connection with bicycles; and it consists in the novel construction of the attachment whereby upon its application to a wheel of ordinary type the latter may be readily and quickly converted into a tricycle.

The invention further consists in the construction, arrangement, and combination of the various parts of the attachment, all as more fully hereinafter described and shown.

In the drawing the figure is a perspective view of the attachment and of a portion of a bicycle-frame to which it is adapted to be applied, some of the parts of the device being detached to more fully illustrate their construction.

In the single figure thus briefly referred to the letter A designates a transverse support comprising in its construction two laterally-extending tubular bearings B and C and a yoke-shaped connecting-bar D. The bearings referred to are secured at their inner ends to the connecting-bar, and within the bearings are arranged wheel-journals E and F.

The support is provided with depending hangers G in the form of apertured ears, and H are bolts extending through the hangers, carrying at their free ends a clamping-nut I. The hangers are adapted to be moved into parallelism and contact with the bifurcated members J of the rear-wheel fork of the bicycle-frame and to be clamped to the rear portion of said frame by means of the bolts referred to. Each tubular bearing is provided with annular casings *a* and *b* upon its inner and outer ends, respectively, in which are located the usual ball-bearings (not shown) that are ordinarily employed for bicycle-journals. Each journal is provided at its outer end with a cone-bearing K, which is centrally bored, the bore extending some distance within the journal to receive a threaded bolt L, the function of which will be hereinafter set forth.

Upon the inner end of the journal F is a thumb-nut M, which is employed for properly adjusting the journal within its bearing, and N designates a sprocket-wheel upon the inner end of the journal E, which is adapted to be driven by the propelling mechanism of the bicycle.

In practice the attachment is preferably manufactured with only one wheel attached to one of the journals, so that the rider may utilize the rear wheel of the bicycle as the complementary wheel of the attachment.

The wheels (designated by the reference-letter P) may be secured to the journals in any approved manner. The preferable means employed, however, consist of the threaded securing-bolt L, before referred to, which is adapted to clamp the wheel to its journal.

In securing the wheel the bolt is inserted through the hub and is screwed into the bore formed within the cone and the journal. A cone-bearing Q is arranged upon the outer end of the bolt and is brought into proper relation to the outer ball-bearing within the wheel and the latter clamped tightly to the journal by the proper insertion of the bolt.

I may and preferably do employ means in addition to the hangers for the purpose of securing the attachment to the bicycle-frame, which means consist, essentially, of braces, such as R. These braces may be attached at their upper ends in any suitable manner to such portions of the frame as may be convenient and at their lower ends to the transverse support.

As the most convenient means for making the last attachment I form an apertured ear *c* upon the tubular bearing, to which is adapted to be clamped the lower end of the brace, the latter being apertured to permit of suitable securing means being inserted therethrough.

From the foregoing description of my invention the manner of application of my attachment to a bicycle-frame will be readily observed. The construction of the attachment as shown and described I deem the preferable form in which to manufacture it. It will be readily apparent, however, that various modifications may be made without in any manner departing from the spirit of my invention.

What I claim as my invention is—

1. An attachment for bicycles, consisting of a transverse support, bearings thereon adapted to be detachably secured to the rear forks of a bicycle-frame, and wheel-journals carried by the support, extending beyond the frame upon opposite sides of the latter.

2. An attachment for bicycles, consisting of a transverse support, bearings arranged substantially centrally thereon adapted to engage within the bifurcated members of the rear-wheel fork of a bicycle-frame, and wheel-journals carried by the support and extending beyond the frame upon opposite sides of the latter.

3. An attachment for bicycles consisting of a transverse support, hangers depending therefrom adapted to engage the bifurcated members of the rear-wheel fork of a bicycle-frame, and wheel-journals carried by the support and extending beyond the frame upon opposite sides of the latter.

4. An attachment for bicycles consisting of a transverse support, bearings thereon adapted to be engaged within the bifurcated members of the rear fork of a bicycle-frame, a wheel-journal carried at each end of the support, and a driving device for one of the journals adapted to be operated by the propelling mechanism of the bicycle.

5. An attachment for bicycles consisting of a transverse support, comprising two lateral, tubular bearings and a cross-bar connecting the bearings, securing devices upon the support adapted to engage the bifurcated members of the rear fork of a bicycle-frame, and a wheel-journal within each tubular bearing.

6. An attachment for bicycles consisting of a transverse support, comprising two lateral, tubular bearings, and a yoke-shaped cross-bar connecting the bearings, securing devices upon the support adapted to engage the bifurcated members of the rear fork of a bicycle-frame, a wheel-journal within each bearing, and a sprocket-wheel secured to the inner end of one of the journals, adapted to be driven by the propelling mechanism of the bicycle.

7. An attachment for bicycles consisting of a transverse support comprising two lateral tubular bearings and a yoke-shaped cross-bar connecting the bearings, securing devices upon the support adapted to engage the rear fork of a bicycle-frame, a wheel-journal within each bearing, each journal carrying at its outer end a cone-bearing, wheels for the journals, means for securing the wheels to said journals, comprising threaded bolts adapted to extend through the wheel-hub and into the journal, and a cone-bearing at the headed end of the bolt, and a sprocket-wheel attached to the inner end of one of the journals, adapted to be driven by the propelling mechanism of the bicycle.

In testimony whereof I affix my signature in presence of two witnesses.

J FRANK SHUGERS.

Witnesses:
W. J. SWEET,
E. D. GREENAMYER.